Feb. 28, 1939.   F. MESINGER   2,149,247
SADDLE
Filed Jan. 20, 1936   2 Sheets-Sheet 1

INVENTOR
Frederick Mesinger
BY
William F. Mesinger
ATTORNEY

Feb. 28, 1939.  F. MESINGER  2,149,247
SADDLE
Filed Jan. 20, 1936  2 Sheets-Sheet 2

INVENTOR
Frederick Mesinger
BY
William F. Mesinger
ATTORNEY

Patented Feb. 28, 1939

2,149,247

UNITED STATES PATENT OFFICE 2,149,247

SADDLE

Frederick Mesinger, Mount Vernon, N. Y.

Application January 20, 1936, Serial No. 59,868

7 Claims. (Cl. 155—5.17)

This invention relates to saddles and particularly to the seat portion of saddles for bicycles and similar vehicles.

The invention has for its object to provide an improved resilient supporting arrangement for the top covering of the saddle so that the body of the rider will be substantially insulated from the shorter vibrations of the vehicle.

More specifically the invention has for an object to provide a saddle having a detachable top covering and a flexible resilient base for supporting the same comprising sections of flexible material yieldingly stretched between rear and front portions of a frame.

It is also a further object of the invention to provide a saddle construction of the above character in which the several parts are of relatively simple construction and wherein means is provided enabling the saddle top to be easily and quickly detached from the supporting base structure and replaced by a new top.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawings, in which.

Figure 1:
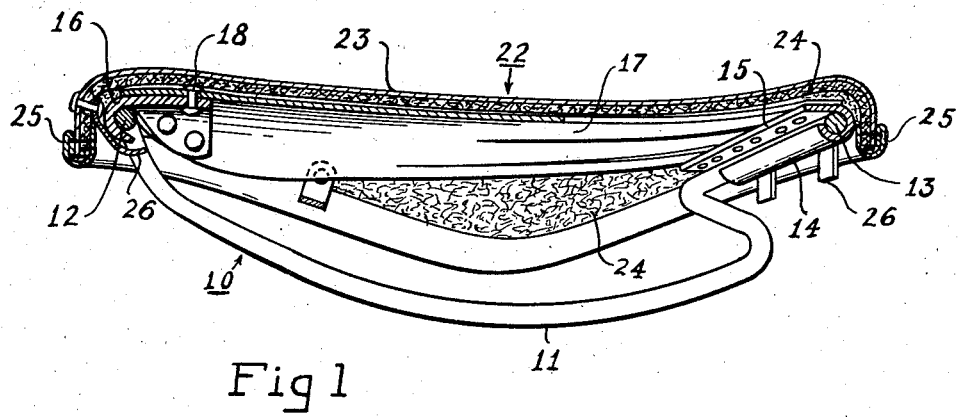
Fig. 1 is a longitudinal sectional view of a saddle constructed in accordance with the present invention.

Referring to the embodiment shown in Fig. 1 the top supporting portion is suspended between the narrow forward or pommel end and the relatively wide rearward or cantle portion of a frame 10 which has two side or reach member portions 11 adapted to be attached by the customary clamping means to the seat post of a bicycle. The side members 11 at their forward or pommel portions curve upwardly and are joined by a relatively short transverse portion 12. The rear portions of the side members 11 are formed upwardly and outwardly and are joined by a relatively wide arcuate portion 13.

A tubular sheet metal cantle member 14 substantially encompasses portion 13 and has a rim 15 projecting forwardly from the upper surface of portion 13. A pommel member 16 is provided with a hook portion for engaging the transverse portion 12 of the frame and a hollow cylindrical portion open at the bottom and projecting rearwardly.

Attached to and stretched between the rim 15 and the pommel member 16 is disposed a top cover support 17 consisting of flexible sheet material such as for example, leather. The pommel portion of support 17 is curved downward in contact with the outer surface of pommel member 16 and is attached thereto by rivets 18. The rearward or cantle edge of support 17 is divided into a desired number of sections 19, 19', 19'', 20, 20', 20'' which are attached to the rim 15 by rivets 21. The top support 17 in the form shown being cut from a continuous sheet of material, the sections 19, 20 etc. are produced by slitting the material forwardly from the cantle edge. The central kerf between sections 19 and 20 is made preferably shortest while the kerfs between sections 19' and 19'' and 20' and 20'' extend furthest forward, the other two being of intermediate length.

Figure 2:
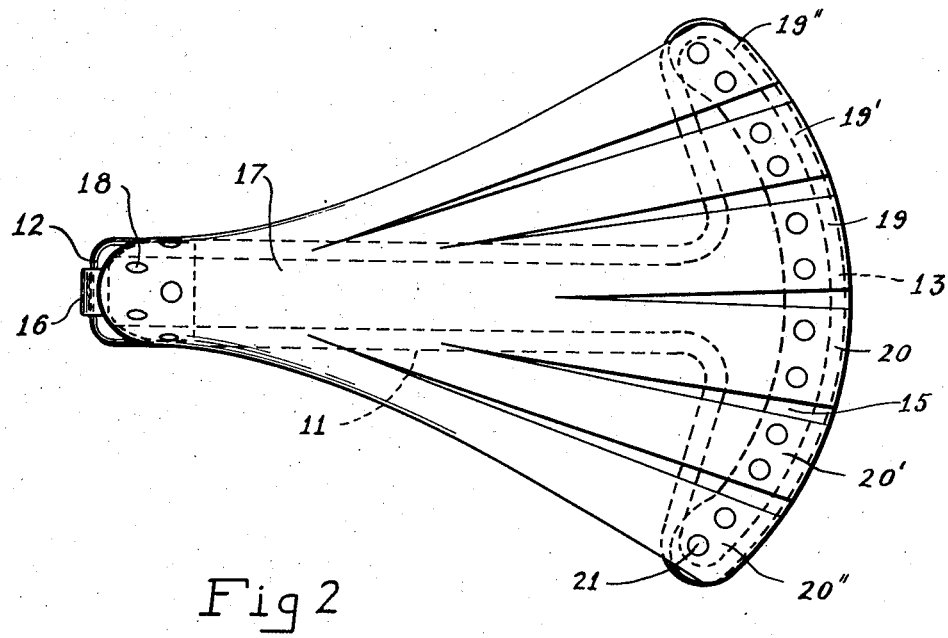
Fig. 2 is a top plan view of the saddle shown in Fig. 1 with the cover portion thereof removed to show the cover support.

When desired the top support 17 may be made unkerfed or the support may comprise a plurality of individual sections, however, the form shown is preferred since the division of the major portion of the support 17 into sections provides for a more equalized distribution of the stretching stresses among the sections and avoids difficulties due to overlapping of individual sections attached to the pommel member. Manufacture is also facilitated, for slight inequalities unavoidably encountered during riveting are rendered nondetrimental. The number of kerfs cut may be varied from that shown according to the effects desired. In the embodiment of the invention shown in Figs. 1 and 2 the frame 10 is formed of spring steel preferably in one piece so as to provide such a character of stretching tension upon the support 17 that the latter will retain the desired degree of resiliency when depressed.

The top of the saddle, indicated generally at 22, is so constructed that it may be readily detached from the support 17 and frame 10. It consists of a covering sheet 23, preferably of leather, formed by pressure to the desired customary saddle shape having downwardly projecting edges; a layer of resilient padding 24 attached by cement to the underside of the cover; an edging or bead strip 25; and holding clips 26. The bead strip 25 is arranged to cover the edges of the cover 23 and padding 24. It is applied by first sewing it against the outer surface of the cover 23 with one of its edges contiguous with the edge of the cover and then folding the strip over the stitching and the sewn edges inwardly and cementing it to the padding 24. The holding clips 26 are strips of metal attached by rivets to the inner side of the saddle top at desired points close to the bead and adjacent suitable parts of the supporting base about which they may be bent.

It will be seen that the saddle top 22 may be readily removed for replacement by another merely by straigthening out clips 26 and lifting off the top. The top is resiliently supported by the support 17 in such a way by virtue of its division into sections, that the body of the rider may depress it to a greater degree at one portion of the top than at another so that the rider is more comfortably supported. Downward pressure on the support 17 causes it to deflect, thus shortening the distance which it spans so that the cantle and pommel portions of the frame 10 tend to be drawn toward each other. This tendency is resiliently resisted by frame 10 whose shape and stiffness are selected to provide the desired stretching forces. It will be seen also that the deformability of the support 17 is such that the provision of a relatively thick layer of padding such as is customarily provided in saddles having a rigid base is unnecessary and that padding 24 may be omitted if desired, particularly when support 17 is of live rubber.

Figure 3:
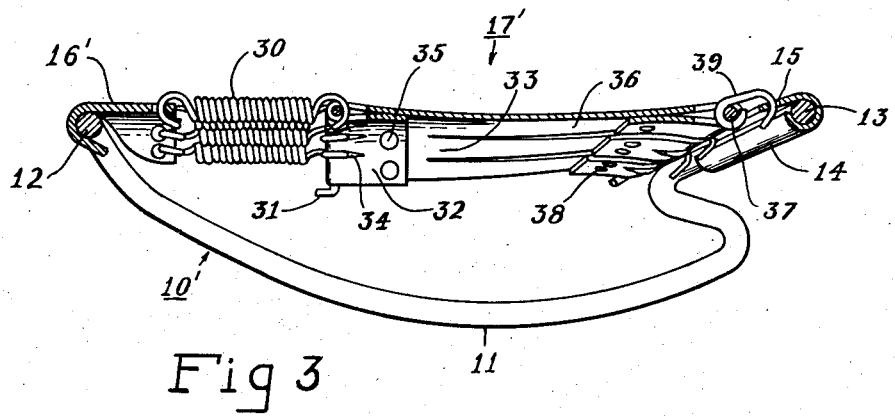
Fig. 3 is a view in longitudinal section of another form of saddle top support structure in accordance with the invention the cover portion being removed in the interest of clearness.
Figure 4:
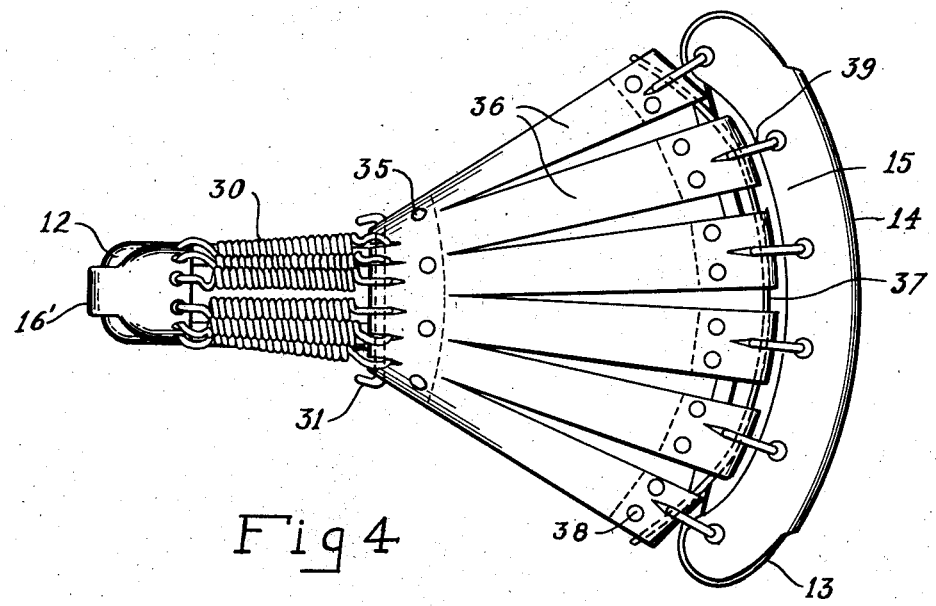
Fig. 4 is a top plan view of the structure shown in Fig. 3.

The form of supporting base structure shown in Figs. 3 and 4 employs a frame 10' which may be more rigid since additional tension means is utilized for providing an improved degree of resilience in the support 17'. The additional tension means here shown comprises a plurality of relatively small coil springs 30 each having one opened end hooked thru perforations in the pommel member 16' and the other end hooked over a relatively small rod 31 which passes thru a loop or loops 32 formed by folding over the forward edge of the flexible sheet 33. The loop fold 32 is cut in places corresponding in number to the springs 30 to provide passages 34 for the hooklike ends of the springs and is made fast to the main portion of the sheet by rivets 35, although other attaching means of known variety may be used, such as stitching. The rod 31 is bent over at each end to retain it in position. The flexible sheet 33 is divided substantially completely into six sections 36 spreading fan wise toward the cantle 14. The unjoined ends of each section are folded over an arcuate wire 37 and attached to the under side of the sections by means of rivets 38. Each fold is slitted centrally in a manner to provide passages for wire hook links 39 which are arranged to pass therethrough and around the wire 37, the other ends being hooked through perforations in the rim 15.

In this form of the invention the links 39 provide connections that allow free movement of the parts for resilient flexure. The springs 30 whose strength and number may be varied according to the effect desired, hold the support sheet 33 stretched to the desired stiffness while providing a high degree of resilience. It is also contemplated that if desired each section 36 may be completely severed from the others and individually attached to its corresponding spring 30 particularly if cut from sheet metal. Also as another alternative, each section 36 may be attached directly to the rim 15 by passing its end through slots cut in the rim and folding the end over.

The top cover is removed from the base structure shown in Figs. 3 and 4 in the interest of clearness of the drawings. It is preferably of the same form as that shown at 22 of Fig. 1 although other varieties of top material and structure may be employed such for example as an integral molded rubber top.

Since certain changes may be made in the present saddle construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent, is:

1. A cycle saddle comprising a spring metal frame adapted to be clamped to a seat post and having a narrow front transverse portion and a rearwardly disposed transverse relatively wide arcuate portion, a top covering, a pommel member removably hooked to said front transverse portion, a cantle member secured to said arcuate portion having a forwardly directed rim, and means for resiliently supporting said covering suspended between said front and rear portions, and attached to said pommel member and said rim.

2. A cycle saddle comprising a frame adapted to be clamped to a seat post and having a narrow front transverse portion and a rearwardly disposed transverse relatively wide arcuate portion, a top covering, a pommel member removably hooked to said front transverse portion, a cantle member secured to said arcuate portion having a forwardly directed rim, and a plurality of live rubber sections joined at their pommel end and separated at their cantle end suspended between said front and rear portions and connected to said pommel member and said rim.

3. A cycle saddle comprising a frame adapted to be clamped to a seat post and having a narrow front transverse portion and a rearwardly disposed transverse relatively wide arcuate portion, a top covering, a pommel member hingedly connected to said front transverse portion, and means for resiliently supporting said covering suspended between said front and rear portions and connected to said pommel member by resilient tension means.

4. A cycle saddle comprising a frame adapted to be clamped to a seat post and having a front transverse portion and a rearwardly disposed transverse arcuate portion, a top covering, a pommel member hingedly connected to said front transverse portion, a cantle member attached to said arcuate portion having a forwardly directed rim, means for resiliently supporting said covering suspended between said front and rear portions, tension means connecting the forward edge of said supporting means to said pommel member and hooks hingedly connecting the rearward edge of said supporting means to said rim.

5. A cycle saddle comprising a frame adapted to be clamped to a seat post and having a narrow front transverse portion and a rearwardly disposed transverse relatively wide arcuate portion, a top covering, a pommel member hingedly connected to said front transverse portion, a cantle member attached to said arcuate portion, means for resiliently supporting said covering suspended between said front and rear portions, and connected to said cantle, and tension means connecting said supporting means to said pommel member.

6. In a bicycle saddle the combination of a top cover, suspension means for supporting said top cover, and a frame for carrying said suspension means, said frame comprising a single piece of spring metal rod formed to provide longitudinal upwardly curving members adapted to be clamped to a seat post, a forwardly disposed relatively short transverse portion and a rearwardly disposed relatively wide transverse portion.

7. In a bicycle saddle the combination of a top cover, suspension means for supporting said top cover, a frame for carrying said suspension means, said frame comprising a single piece of spring metal rod formed to provide longitudinal upwardly curving members adapted to be clamped to a seat post, a forwardly disposed relatively short transverse portion and a rearwardly disposed relatively wide transverse portion, and a sheet metal cantle member having a portion secured to said rear transverse portion and adapted to rigidly align the ends of said metal rod.

FREDERICK MESINGER.